Figure 1:
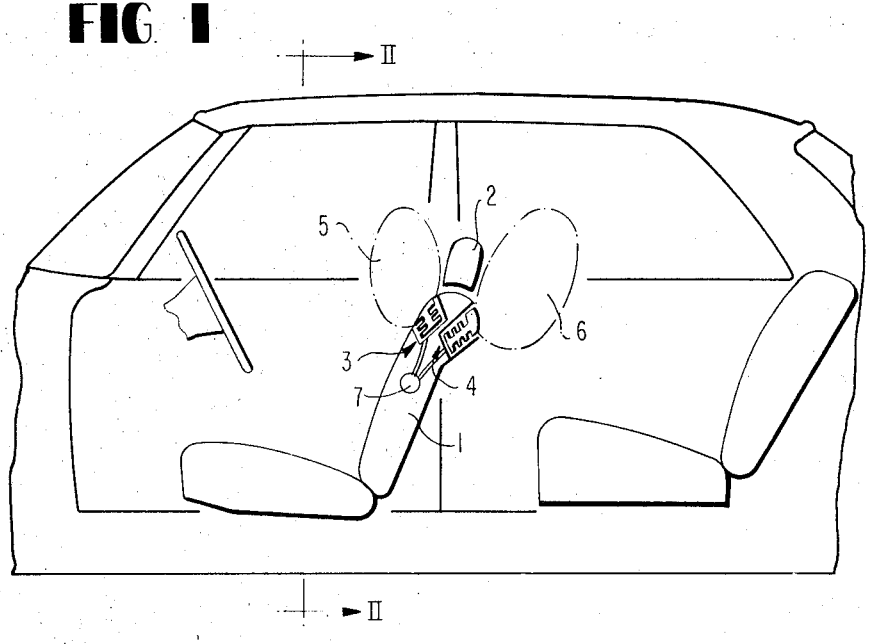

United States Patent [19]
Wilfert

[11] 3,779,577
[45] Dec. 18, 1973

[54] SAFETY INSTALLATION FOR THE PASSENGERS OF VEHICLES, ESPECIALLY PASSENGER MOTOR VEHICLES

[75] Inventor: Karl Wilfert, Gerlingen-Waldstadt, Germany

[73] Assignee: Daimler-Benz Aktiengesellschaft, Stuttgart-Unterturkheim, Germany

[22] Filed: Nov. 23, 1971

[21] Appl. No.: 201,407

[30] Foreign Application Priority Data
Nov. 28, 1970 Germany.................. P 20 58 608.7

[52] U.S. Cl. .......................................... 280/150 AB
[51] Int. Cl. ............................................... B60r 21/10
[58] Field of Search.................. 280/150 AB, 150 B

[56] References Cited
UNITED STATES PATENTS

| 3,642,303 | 2/1972 | Irish et al. | 280/150 AB |
| 3,603,535 | 9/1971 | DePolo | 280/150 AB |
| 3,510,150 | 5/1970 | Wilfert | 280/150 AB |
| 3,663,035 | 1/1970 | Norton | 280/150 AB |
| 2,418,798 | 4/1947 | Whitmer | 280/150 AB X |
| 3,476,402 | 11/1969 | Wilfert | 280/150 AB |

*Primary Examiner*—Kenneth H. Betts
*Attorney*—Craig, Antonelli & Hill

[57] ABSTRACT

A safety installation for the passengers of motor vehicles, especially of passenger motor vehicles in which the backrests of the front seats are equipped with a headrest and accommodate within the area of each backrest underneath the headrest two inflatable gas cushions which are so arranged that upon inflation one gas cushion unfolds in front and one gas cushion unfolds behind the headrest.

6 Claims, 2 Drawing Figures

SAFETY INSTALLATION FOR THE PASSENGERS OF VEHICLES, ESPECIALLY PASSENGER MOTOR VEHICLES

The present invention relates to a safety installation for the passengers of vehicles, especially of passenger motor vehicles, in which the backrests of the front seats are each equipped with a headrest.

The present invention is concerned with the task to provide a safety installation which during collisions reduces to a minimum the danger of a head or cervical spine injury of those seated in the vehicle in front as well as those seated in the rear during impact against the backrests of the front seats or against the headrests and which simultaneously prevents that a rear seat passenger becomes wedged-in between the front seats.

In particular, it has been discovered, for example, that during collisions persons present in the vehicle have been thrown back in numerous cases in such a manner that they laterally miss the existing headrests and that thus serious spinal injuries may occur notwithstanding the headrests.

As a solution to the underlying problems, a safety installation is therefore proposed for the passengers of vehicles, especially of passenger motor vehicles, in which the backrests of the front seats are equipped with a headrest, whereby according to the present invention two inflatable gas cushions of conventional construction and made from flexible material are each so arranged in the upper area of the backrests underneath the headrest that during the inflation one gas cushion unfolds in front of and one gas cushion unfolds behind a given headrest.

The inflating of the gas cushion can thereby be triggered in a conventional manner in dependence on a deceleration switch arranged in the vehicle which responds upon exceeding a predetermined deceleration of the vehicle.

According to a particularly advantageous embodiment of the present invention the gas cushions are so dimensioned that in the inflated condition, the mutually facing surfaces of the gas cushions provided at the backrests of two seats arranged one adjacent the other, at least approximately contact one another. It is achieved thereby that in the upper area the gap between the backrests of the front seats is practically closed so that a far-reaching protection is thereby created also for the persons present in the rear of the vehicle.

In the folded-together condition, the gas cushions are arranged preferably in approximately horizontally extending recesses of the backrests.

Accordingly, it is an object of the present invention to provide a safety installation for the passengers of vehicles, especially of passenger motor vehicles, which avoids by simple means the aforementioned shortcomings and drawbacks encountered in the prior art.

Another object of the present invention resides in a safety installation for the passengers of motor vehicles which greatly reduces the injury danger for head injuries and spine injuries during a collision accident.

A further object of the present invention resides in a safety installation which in particular effectively prevents rear passengers from becoming wedged-in between the front seats when thrown forwardly in case of an accident.

Figure 2:
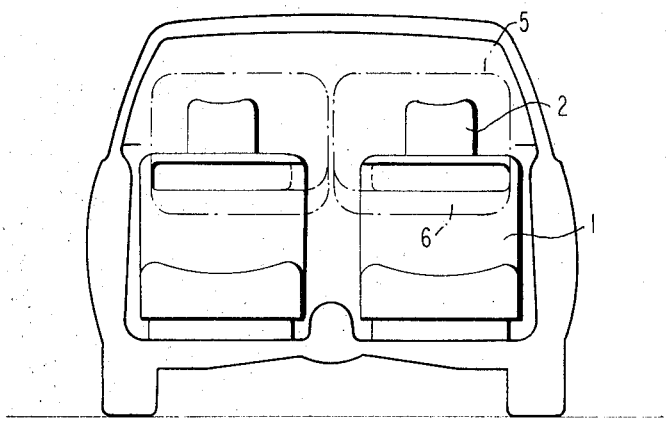

These and other objects, features and advantages of the present invention will become more apparent from the following description when taken in connection with the accompanying drawing which shows, for purposes of illustration only, one embodiment in accordance with the present invention, and wherein FIG. 1 is a somewhat schematic side elevational view of the center portion of a passenger motor vehicle equipped in accordance with the present invention, and FIG. 2 is a cross sectional view taken along line II—II of FIG. 1.

Referring now to the drawing wherein like reference numerals are used throughout the two views to designate like parts, one headrest 2 each is secured at the backrests 1 of the front seats illustrated in the drawing. Two folded-together gas cushions 5 and 6 are arranged in the upper area of each backrest 1 underneath the headrest 2 within recesses generally designated by reference numerals 3 and 4. During actuation of a conventional filling device (not illustrated) which may be common to both gas cushions 5 and 6, one gas cushion 5 unfolds and inflates in front of the headrest 2 and the other gas cushion 6 unfolds and inflates to the rear of the headrest 2. The inflated position of the gas cushions 5 and 6 is indicated in both figures of the drawings in dash-and-dot lines.

As can be seen in particular from FIG. 2, the gas cushions 5 and/or the gas cushion 6 are of such dimensions that in the inflated condition the mutually facing surfaces thereof at least approximately contact one another to thereby close the gap that would otherwise exist between the front seats, for example, with the use of bucket seats. Furthermore, it is also advantageous if the volume of the gas cushion 6 arranged behind the headrest 2 is larger than the volume of the corresponding gas cushion 5 arranged in front thereof. Any conventional filling device and deceleration switch may be used for filling the gas cushions 5 and 6 when the deceleration of the vehicle exceeds a predetermined value. However, it is also particularly advantageous if the inflating gas pressure is supplied to both gas cushions 5 and 6 of a respective backrest 1 from a common gas source 7.

While I have shown and described only one embodiment in accordance with the present invention, it is understood that the same is not limited thereto but is susceptible of numerous changes and modifications as known to those skilled in the art and I therefore do not wish to be limited to the details shown and described herein, but intend to cover all such changes and modifications as are encompassed by the scope of the appended claims.

What I claim is:

1. An installation for increasing the safety of passengers in motor vehicles comprising passenger seat means, each of said seat means having a backrest means and a seat portion; a fixed headrest means secured to a top portion of each of said backrest means; and first and second gas cushion means connected to each of said backrests at said top portion, said first gas cushion means extending on inflation to a position in front of said headrest means and said second gas cushion means extending on inflation to a position behind said headrest means wherein said first and second gas cushion means are in a cooperative position with respect to said headrest means such that a passenger in one of said seat means having his head thrown backward during a collision is protected by at least one of said first gas cushion means and said headrest means and such that a passenger behind one of said seat means is protected by said second gas cushion means from impact with said seat means upon being thrown forward during a collision.

2. An installation according to claim 1, wherein each of said first and second gas cushion means is dimensioned on inflation to a size such that mutually facing surfaces of respective first and second gas cushion means connected to laterally adjacent backrest means at least approximately contact one another, such that gaps between said backrest means are minimized.

3. An installation according to claim 1, wherein each of said first and second gas cushion means is dimensioned on inflation to a size larger than the size of said headrest means.

4. An installation according to claim 1, wherein said first and second gas cushion means in an uninflated condition are arranged in approximately horizontally extending recesses of the backrest means.

5. An installation according to claim 1, wherein said second gas cushion means arranged behind said headrest means has a greater volume than the volume of said first gas cushion means arranged in front of said headrest means.

6. An installation according to claim 1, wherein the first and second gas cushion means of a respective backrest means are inflated from a common gas source.

* * * * *